United States Patent [19]

Müller et al.

[11] Patent Number: 4,820,745

[45] Date of Patent: * Apr. 11, 1989

[54] PRESSURE-SENSITIVE ADHESIVES BASED ON RADIATION-CURABLE POLYESTERS CONTAINING (METH)ACRYLIC GROUPS

[75] Inventors: Hartmut Müller, Troisdorf; Hans Huber, Lohmar, both of Fed. Rep. of Germany

[73] Assignee: Huels Troisdorf Aktiengesellschaft, Cologne, Fed. Rep. of Germany

[*] Notice: The portion of the term of this patent subsequent to May 26, 2004 has been disclaimed.

[21] Appl. No.: 860,635

[22] Filed: May 7, 1986

[30] Foreign Application Priority Data

Jul. 5, 1985 [DE] Fed. Rep. of Germany ....... 3516351

[51] Int. Cl.$^4$ .......................... C08F 2/54; C08F 20/36; C08F 20/58
[52] U.S. Cl. ........................ 522/90; 522/97; 522/104; 526/301; 526/320; 526/323.1; 428/423.7; 428/482
[58] Field of Search ..................... 522/96, 97, 104, 90; 528/49; 526/320, 301, 323.1

[56] References Cited

U.S. PATENT DOCUMENTS

| | | | |
|---|---|---|---|
| 3,053,783 | 9/1962 | Broadhead | 528/296 |
| 3,664,861 | 5/1972 | Okamura et al. | 117/93.31 |
| 3,673,140 | 6/1972 | Ackerman et al. | 260/22 TN |
| 3,686,360 | 8/1972 | Cunningham | 260/850 |
| 3,864,133 | 2/1975 | Hisamatsu | 522/90 |
| 3,979,426 | 9/1976 | DeMajistre | 522/96 |
| 4,080,316 | 3/1978 | Holda et al. | 260/75 R |
| 4,082,710 | 4/1978 | Vrancken | 522/96 |
| 4,147,737 | 4/1979 | Sein et al. | 260/835 |
| 4,158,618 | 6/1979 | Pastor | 522/100 |
| 4,164,486 | 8/1979 | Kudo | 522/96 |
| 4,172,822 | 10/1979 | Patzschke | 525/424 |
| 4,174,307 | 11/1979 | Rowe | 522/96 |
| 4,206,025 | 6/1980 | Vranken | 522/163 |
| 4,233,425 | 11/1980 | Tefertiller | 522/96 |
| 4,239,866 | 12/1980 | Reitel et al. | 525/440 |
| 4,423,179 | 12/1983 | Guagliardo | 524/539 |
| 4,451,627 | 5/1984 | Frisch | 526/192 |
| 4,605,681 | 8/1986 | Grey | 528/49 |
| 4,609,682 | 9/1986 | Weber | 528/49 |

FOREIGN PATENT DOCUMENTS

| | | |
|---|---|---|
| 54105 | 9/1981 | European Pat. Off. . |
| 2310128 | 10/1973 | Fed. Rep. of Germany . |
| 2824418 | 12/1978 | Fed. Rep. of Germany . |
| 3115072 | 11/1982 | Fed. Rep. of Germany . |
| 3213160 | 10/1983 | Fed. Rep. of Germany . |

OTHER PUBLICATIONS

PTO Translation of Leitner.
Saegusa; "New Developments in Polymer Synthesis", *New Trends in Chemistry* 87-90, 94 (1982).

Primary Examiner—Lewis T. Jacobs
Assistant Examiner—Arthur H. Koeckert
Attorney, Agent, or Firm—Felfe & Lynch

[57] ABSTRACT

Pressure-sensitive adhesives composed of radiation-cured (meth)acrylic-functional polyesters are prepared from base polyesters, fluid at room temperature, which have molecular weights of 1,000 to 10,000 and branched main chain, and/or from new polyesters having aliphatic side chains bound by ester bridges or, in some cases, ether bridges to the main chain, followed by functionalization of a maximum of 90% of the original hydroxyl groups of the base polyesters by reaction with (meth)acrylate compounds, and crosslinked by electron beam or ultraviolet radiation in a thin coating on a support. The new pressure-sensitive adhesives have the property and the advantage of being cross-linkable by radiation without the use of solvents or diluents.

26 Claims, No Drawings

PRESSURE-SENSITIVE ADHESIVES BASED ON RADIATION-CURABLE POLYESTERS CONTAINING (METH)ACRYLIC GROUPS

BACKGROUND OF THE INVENTION

Materials or preparations suitable for use as pressure-sensitive adhesives have permanent tackiness, good ability to flow onto different surfaces, and a balanced amount of adhesion and cohesion. Typically, foliar materials are preferentially coated with pressure-sensitive adhesives, so that the end-user enjoys the convenience of a self-adhesive product such as adhesive tape, stick-on labels or the like. For the preparation of such self-adhesive products the pressure-sensitive adhesive preparation must be applied in liquid form to the particular substrate and then be solified by suitable measures. The simplest and oldest method of doing this is to dissolve the adhesive in organic solvents. Large amounts of solvents, however, require either the burning off of the solvent vapors from the drying operation, or the use of a recovery system. These costs and disadvantages are avoided by the use of aqueous adhesive dispersions, yet the drying of aqueous preparations requires a high energy input and permits only low manufacturing speeds.

Pressure-sensitive adhesives which have to be applied in the molten state are, for example, products on the basis of block copolymers of styrene and isoprene or butadiene, as they are first described in U.S. Pat. No. 3,229,478. Melt adhesives of this kind, however, require high temperatures of over 150° C., for example, in order to be sufficiently fluid for the coating operation. Furthermore, the material has poor stability against atmospheric oxygen, heat and light, and against solvents. Thus, it cannot be used in critical, high-performance applications.

There has been no lack of attempts to produce a pressure-sensitive adhesive by chemical reaction from fluid polymer mixtures. The use of polyesters as a basis for pressure-sensitive adhesives in a reactive system is described in German Federal Patent No. 32 20 865, according to which a reaction of hydroxyl polyesters with alkoxysilyl-functional compounds produces crosslinkable polymers, but even at 100° C. they set too slowly.

All these reactive systems have numerous difficulties in common: the difficulty of precisely proportioning the functionalizing compounds, their insufficient speed of reaction, and especially the inconsistency of the properties of the pressure-sensitive adhesive. There are difficulties in all reactive systems in achieving the balance between the adhesive strength and cohesive strength of the adhesive. Often post-reactions occur when the self-adhesive product is stored, which can result in great changes in their properties and even in a loss of tack.

In the other fields of printing inks and protective coatings there is the curing of polyesters containing (meth)acrylic groups of high-energy radiation, i.e., ultraviolet light or electron beams (EB) according to DE-OS No. 28 38 691 and DE-OS No. 34 21 826, and the direct radiation-induced polymerization of monomeric mixtures according to U.S. Pat. No. 3,772,063, as well as the hardenable solution of polymers or prepolymers in monomer mixtures according to U.S. Pat. No. 4,133,731. Disadvantages in fabrication are high contents of still-unbound esters of (meth)acrylic acid, producing inflammable vapors which are toxic and irritate the mucous membranes and have a very offensive odor. Even after polymerization or crosslinking, there is still an unacceptably high content of residual monomers to be found.

Radiation-setting melt adhesives according to U.S. Pat. Nos. 4,052,527 and 4,438,177 can be processed only at high temperatures, require high radiation dosages to set them, resulting in damage to the substrate, and they provide too little variability in the properties of the adhesive.

The problem therefore existed of developing pressure-sensitive adhesives having the following properties:
free of solvents and other volatile components,
free of unsaturated monomers, low odor, nontoxic,
free as possible of color, preferably water-clear,
applicable at low temperatures of no more than 50° to 120° C.,
curable at low radiation energy of, e.g., 2 to 5 Mrad,
high production rate in coating operation, even when applying large amounts of adhesive,
coverage of a broad range of adhesive properties, including the high performance range of high strength and low aging by light, oxygen or heat.
This problem is solved by the invention.

THE INVENTION

The subject matter of the invention are pressure sensitive adhesives on the basis of polyesters having acrylic groups or methacrylic groups, characterized in that
(a) Base polyesters are used containing hydroxyl groups and having average molecular weights of 1,000 to 10,000 and being fluid at 20° C., from the group:
   a1 hydroxyl polyesters with branched chain, consisting of polyester units, with branching at third and higher polyester-forming functions, and/or
   a2 hydroxyl polyesters with alkyl side chains bound through ester groups or ether bridges of third or higher polyester-forming functions and having 4 to 36 carbon atoms in the alkyl group,
wherein 10 to 90% of the hydroxyl groups of the polyesters according to a are reacted with acrylate compounds or methacrylate compounds,
(b) the acrylate compounds or methacrylate compounds being selected from the group of:
   b1 isocyanatoalkyl(meth)acrylate and/or
   b2 adducts of di- or triisocyanates or polyisocyanates or isocyanato prepolymers of polyesters or polyethers of low molecular weight with hydroxyalkylacrylates or hydroxyalkylmethacrylates and/or
   b3 methylacrylamidoglycolatemethylether and/or
   b4 upon the reaction of 10 to 90% of the hydroxyl groups of the polyesters with a dicarboxylic acid, tricarboxylic acid or their anhydrides to form carboxyl groups, subsequently reaction of the carboxyl groups with glycidyl acrylate or glycidyl methacrylate and/or
   b5 methacrylic acid or acrylic acid, and
(c) the polyesters bearing methacrylic groups or acrylic groups thus prepared are spread as a thin coating to the surface of substances and crosslinked or set by means of electron beams or ultraviolet radiation, optionally after the addition of a photoinitiator with the formation of permanently tacky surfaces of the pressure sensitive adhesive layers.

Further subject matter of the invention is a method for the preparation of pressure-sensitive adhesives from macromers on the basis of polyesters which bear acrylate groups or methacrylate groups and are crosslinkable by radiation, characterized in that, in a first step, a base polyester containing hydroxyl groups and having an average molecular weight of 1,000 to 10,000, which is fluid at 20° C., by:

a$_1$ preparation of a hydroxylpolyester with branched chain consisting of polyester units, with branching at third and higher polyester-forming functions, by condensation of diols and dicarboxylic acids or their polyester-forming derivatives or anhydrides, and at least 1 mol-%, with respect to the total diols and dicarboxylic acids, of a trifunctional, polyester-forming compound from the group, triols, tricarboxylic acids or their derivatives or anhydrides, or hydroxycarboxylic acids, at temperatures of 140° to 230° C., in a manner known in itself, with a molar excess of diols plus triols above the di- plus tricarboxylic acids, and removal of the excess diols in the polycondensation until the hydroxyl number of 10 to 100 and an acid number under 1 is reached, or a$_2$ preparation of a hydroxylpolyester with alkyl side chains of 4 to 36 carbon atoms in the alkyl group, bound through ester groups or ether bridges of third or higher polyester-forming functions, by condensation of diols and dicarboxylic acids or their polyester-forming derivatives or anhydrides and tricarboxylic acid mono- or di- or trialkyl esters, trimethylolpropane monocarboxylic acid esters and/or glycidyl esters of saturated monocarboxylic acids with 4 to 36 carbon atoms in the alkyl moiety, or of the monocarboxylic acids, at temperatures of 140° to 230° C. with a molar excess of diols plus, in some cases, glycidyl esters, above dicarboxylic acid or of their derivatives or anhydrides plus tricarboxylic acid monoesters, and removal of the excess diol in the polycondensation, until the hydroxyl number of 10 to 100 and an acid number under 1 is reached, and, (b) in a second step, reaction of 10 to 90% of the hydroxyl groups of the polyester with acrylic compounds or methacrylic compounds from the group:

b$_1$ isocyanatoalkyl(meth)acrylate and/or b$_2$ adducts of diisocyanates or polyisocyanates or isocyanato prepolymers of polyester or polyethers of low molecular weight with hydroxyalkyl acrylates or hydroxyalkyl methacrylates and/or b$_3$ methylacrylamidoglycolate methyl ether and/or b$_4$ upon reaction of 10 to 90% of the hydroxyl groups of the polyesters with dicarboxylic acid, tricarboxylic acid or their anhydrides to form carboxyl groups, subsequently reacting the carboxyl groups with glycidyl acrylate and/or glycidyl methacrylate b$_5$ and/or methacrylic acid or acrylic acid by reaction with 1.0 to 1.1 mol of one of the substances b$_1$ to b$_5$ per mol of the hydroxyl groups to be reacted, at 60° to 150° C. and pressures of 350 mbar to standard pressure, with the exclusion of moisture, whereupon (c) polyesters bearing methacrylate groups or acrylate groups are applied in a thin coating and crosslinked by electron beams or ultraviolet radiation thereby forming pressure-sensitive adhesives having permanently tacky surfaces.

The base polyesters used for the production of the radiation-setting macromers are hydroxyl polyesters with hydroxyl numbers of 10 to 100, preferably 20 to 60 mg KOH/g. Also, these hydroxyl polyesters are fluid at room temperature, preferably fluid at 20° C., and have average molecular weights between 1,000 and 10,000, as well as a glass transition temperature below* 0° C., preferably below −20° C., and accordingly they are in an amorphous state.

*the expression setting point or set point is used elsewhere herein to "glass transition temperature (Tg)"

The pressure-sensitive adhesives have the special quality and the great advantage of being able to be applied in a thin coat at temperatures of 20° to 100° C., without the presence of solvents or diluents.

Two different base polymers can be used, namely A1 and A2.

A1 is a branched-chain polyester known in itself, which is formed of diols or triols and dicarboxylic acid or tricarboxylic acid, respectively, the branching of the chain always occurring at the third or higher polyester-forming functions, i.e., at the third hydroxyl group of triols or at the third carboxyl group of tricarboxylic acids.

For the preparation of branched-chain hydroxypolyesters which are fluid at 20° C., any known polyester-forming starting substances can be used, i.e., diols and triols, tetraols in some cases, dicarboxylic acids, tricarboxylic acids of the aliphatic series, the aromatic series and the cycloaliphatic series, in which only as much aromatic dicarboxylic acid and tricarboxylic acid, i.e., generally up to 20% of all di- or tricarboxylic acids, are to be contained as will suffice to produce the fluid state of the polyesters. As the polyester-forming components with a third and higher polyester-forming function, i.e., as triols or tricarboxylic acids, 1 to 30 mol-% can be used, and 1 to 10 mol-% is sufficient, i.e., triols or tricarboxylic acids or their derivatives, with respect to the total amount of diols and triols and dicarboxylic acids and tricarboxylic acids or their derivatives.

Polyester A2 is a new hydroxyl polyester of a novel comb structure, in which, on the not highly branched polyester chain, alkyl side chains are bound to the polyester components with more than two functional groups.

The polyesters are, in the case of A2, those having glass transition temperatures of less than 0° C., preferably less than −20° C., and, in the case of A1, hydroxyl polyesters of these low setting points are selected, especially by the fact that aromatic dicarboxylic acids or several aromatic dicarboxylic acids together with aliphatic dicarboxylic acids are not exclusively used.

The new polyester A2 with alkyl side chains is a hydroxyl polyester that is fluid at room temperature and has hydroxyl numbers of from 10 to 100, composed of bifunctional and polyfunctional starting substances, characterized by straight-chain or branched alkyl side chains of 4 to 36 carbon atoms bound by ester and/or ether bonds of tri- or polyfunctional carboxylic acids and/or triols or polyfunctional polyols and/or hydroxydicarboxylic acids along the main chain of the polyesters, wherein the molar ratio of main-chain ester segments to alkyl side chains amounts to from 1.0 to 0.02 to 2.0, with setting points lower than 0° C., preferably lower than −20° C.

The term, "ester segment of the polyesters," used herein is to be understood as the repetitive grouping

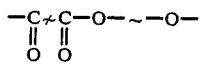

or di- or tricarboxylic acid and ⋌ as its hydrocarbon moiety and a diol or triol with ∼ as its hydrocarbon moiety, the alkyl side chain being bound by a third carboxyl group of the tricarboxylic acid or a third hydroxyl group of the triol.

The new polyesters A2 are not crosslinked and are largely linear, i.e., composed of unbranched main chains with only comparatively little chain branching caused by trifunctional links of the main chain, although tricarboxylic acids or higher polycarboxylic acids, and in some cases triols, or higher functional polyols, must be used to the extent that alkyl side chains are to be bound to the main chain of the polyesters through ester and/or ether bonds.

Accordingly, the new polyesters have entirely or mostly a kind of comb structure—in a planar projection from a simplified point of view—or a structure in which the alkyl side chains project in a random, statistical arrangement from the substantially linear and unbranched main chain of the polyesters.

In the polyesters A2, the alkyl side chains stem from monocarboxylic acid moieties or from monoalkanol moieties which are bound to third functions, i.e., carboxyl groups or ether bridges of tricarboxylic acids or, in some cases, tetracarboxylic acids, or of triols or, in some cases, tetraols in the ester segments. The alkyl side chains are bound substantially uniformly along the main chain of the polyesters, i.e., the ester segments of the main chain of di- or polycarboxylic acids, di- or polyols and dihydroxymono- or hydroxydicarboxylic acids have at least partially carboxyl or ether groups with alkyl moieties of monocarboxylic acid or monoalcohols bound to them.

It is necessary according to the invention that essentially one functionality of the polyester-forming components of only 2 or little more be present in the polyester main chain, i.e., that only 2 carboxyl groups of the polycarboxylic acids or only 2 hydroxyl groups of the polyols or only an average of 2 polyester-forming hydroxyl or carboxyl groups be bound to a hydroxypolycarboxylic acid in the main chain of the polyester, although tricarboxylic acids or higher polycarboxylic acids and triols or higher polyols are used in addition to dicarboxylic acids and diols. The third carboxyl group of the tricarboxylic acids and the third hydroxyl group of the triols bears the said alkyl side chain through the selection of the starting substances and of the conditions of production.

Provision is therefore made, according to the invention, to use preferably alkyl esters of at least trifunctional carboxylic acids, especially monoesters of tricarboxylic acids and diesters of tetracarboxylic acids, but also dialkyl esters of tricarboxylic acids and, in some cases, trialkyl esters of tetrafunctional carboxylic acids or aliphatic monoesters of triols and diesters of tetraols, but also diesters of aliphatic carboxylic acids of triols and triesters of aliphatic carboxylic acids of tetraols as starting substances in addition to the usual dicarboxylic acids and diols or hydroxycarboxylic acids. Preferred are glycidyl esters of monocarboxylic acids and mono- to trialkyl esters of tricarboxylic acids, one alkyl ester group of the monocarboxylic acid being retained in the polyester when the polyester is formed, while other alkyl ester groups are split off in the usual manner. Also preferred are trimethylolpropane esters of monocarboxylic acids.

According to the invention, however, it is also possible in many cases, instead of setting out from, especially, monoesters of polycarboxylic acids or monocarboxylic acid esters of polyols, to set out from the individual components tri- and higher polycarboxylic acids plus monoalcohol or triol or higher polyols, plus monocarboxylic acid, and even combinations of polycarboxylic acid and monocarboxylic acid and polyol and monoalkanol are possible. This procedure is not preferred.

In the polyesters A2 it is greatly preferred to use, for the building up of the alkyl side chains, branched alcohols in the form of their esters or as single components, or branched monocarboxylic acids in the form of their esters or as single components.

The starting substances can be known aliphatic di-, tri- and higher polycarboxylic acids, aromatic di-, tri- and polycarboxylic acids, dihydroxymonocarboxylic acids and hydroxydicarboxylic acids as well as mono- and dialkyl esters of the named di- and higher functional carboxylic acids, mono- or dicarboxylic acid esters of diols and higher polyols or dimonocarboxylic acid esters and mono- or dialkyl esters of mono- or dihydroxymono- or dicarboxylic acids, as well as the mono- and dialkyl esters of diols and higher polyols, as well as the monocarboxylic acids and monoalkanols themselves.

The following bifunctional and polyfunctional polyester-forming starting substances are preferred for the building up of the main chain of the polyesters:

as tri- and polyfunctional polycarboxylic acids: trimellitic acid, trimesinic acid, hemimellitic acid, pyromellitic acid and their polyester-forming derivatives, and very preferentially trimellitic acid anhydride and trimellitic acid monoalkyl ester, dialkyl ester and trialkyl ester;

as dicarboxylic acids: e.g., terephthalic acid, hexahydrophthalic acid, tetrahydrophthalic acid, isophthalic acid, phthalic acid and aliphatic dicarboxylic acids with 2 to 12 carbon atoms, as well as their polyester-forming derivatives such as azelaic acid, sebacic acid and dodecanic acid;

as triols and polyfunctional polyols: glycerol, pentaerythritol and, very preferentially, trimethylolpropane, trimethylolethane, di-trimethylolpropane ethers and their esters and ethers, glycidyl esters of monocarboxylic acids, especially the so-called versatic acids;

as mono- or dihydroxycarboxylic acid: e.g., hydroxysuccinic acid (malic acid) and, as diols, aliphatic diols with 2 to 6 carbon atoms such as monoethylene glycol or hexanediol, as well as ether diols such as diethylene glycol, triethylene glycol and on up to polyether glycols with molecular weights of 1,000.

For the formation of the alkyl side chains, straight-chain or branched alkanols or aliphatic monocarboxylic acids with 4 to 36, preferably 4 to 18 carbon atoms, or the monoesters or, in some cases, diesters, or monoethers or, in some cases, diethers of the named trifunctional or more functional polyols, polycarboxylic acids or hydroxycarboxylic acids are preferred.

Greatly preferred are branched-chain alkanols, especially 2-ethylhexanol or, in some cases, tert.-butanol, as well as branched-chain aliphatic monocarboxylic acids such as 2-ethylhexanic acid, isononanic acid, or alpha,alpha-dialkylmonocarboxylic acids in the form of the versatic acid with, for example, 9 to 11 carbon atoms.

Also decidedly preferred are saturated polyester-forming starting substances, i.e., saturated diols and dicarboxylic acids, saturated tricarboxylic acid esters or, in some cases, tricarboxylic acid, saturated triols and especially glycidyl esters or, in some cases, glycerol. However, even smaller proportions of unsaturated starting substances can be used, up to about 2 mol-%, of, for example, maleic acid anhydride or fumaric acid.

The problem to which the invention is addressed can be solved to special advantage by using trimelliticacid-mono-2-ethylhexyl ester or a mixture of trimelltic acid anhydride and 2-ethylhexanol. Also preferred are tri-methylolpropane monoester, especially the -mono-2-ethylhexanic acid ester.

In the A2 polyesters, the molar ratio of ester segments of the main chain to side chains is to be 1 to 0.02–2.0. In this case the ester segment of the main chain is to be understood to be the bivalent moiety of a dicarboxylic acid moiety bound to a diol moiety, regardless of whether or not this ester segment bears additional carboxyl groups or hydroxyl groups. Such a molar ratio of 1.0 to 4.0 would be conceivable, but polyesters, especially linear polyesters, are very difficult to achieve from a dialkanol ester of a tetracarboxylic acid and the dialkanol ester of a tetraol. On the other hand, a polyester with the said molar ratio of 1.0 to 2.0 with an average of one alkyl side chain for each dicarboxylic acid moiety and one alkyl side chain for each diol moiety, can be made, for example from trimelliticidmono-2-ethylhexylester and trimethylolpropane-2-mono-2-ethylhexanoate and is practical.

Molar ratios of ester segments of the main chain to the side chain of 1.0 to 0.05 to 1.0 are preferred. The polyesters according to the invention have remarkable properties.

In particular, any branching of the polyester chains is largely prevented, so that not only the participating diols and dicarboxylic acids, but all polyols make available an average of 2 hydroxyl groups for the polyester formation, all polycarboxylic acids likewise have 2 carboxyl groups in the ester segments of the main chain to form polyesters, and in hydroxycarboxylic acids likewise 2 of the functional groups contribute to the formation of ester segments of the main chain. A slight chain-branching of the polyester chains, however, is unavoidable and can be tolerated.

The A1 and A2 polyesters have a broad molecular weight distribution and molecular weights from about 1,000 to about 10,000 or more, 2,000 to 5,000 being preferred. The hydroxyl number is between 10 and 100, preferably 20 to 60 mg KOH/g. The polyesters are fluid at 20° C., mostly even at substantially below that. The viscosities in Pa.s at 20° C. are between 70 and about 5,000.

The side-chain polyesters A2 have the special property that only a slight elevation of the temperature results in a substantial reduction of the viscosity. Thus the problem of making available polyesters which can be processed without solvents is solved.

On account of their structure, the A2 polyesters according to the invention are amorphous.

It is very noteworthy that the stated problem can be solved not only with aliphatic dicarboxylic acid components or aliphatic polycarboxylic acid components, but with aromatic dicarboxylic acid and polycarboxylic acid components, even with an exclusive content of aromatic polycarboxylic acids, although a polyester made, for example, from terephthalic acid and ethylene glycol is solid at 240° C. and has a setting point of 73° C., which cannot be substantially lowered by using a mixture of aromatic dicarboxylic acids.

In the state of the art, polyesters having low setting points had to have a high content of aliphatic dicarboxylic acid or diols, so that their adhesion to polar surfaces when used as adhesive is very poor, especially on metals.

The new A2 polyesters, even if they have very high contents of aromatic building blocks, have at the same time a low melt viscosity and low setting points, and they have excellent adhesion to metal.

The setting point of the described polyesters, for equal contents of aromatic di-carboxylic acids, is substantially lower than that of the known polyesters.

With increasing mol content of alkyl side chains and increasing length of the alkyl side chains, the setting point decreases.

An example of this is shown in Table 1. However, whether the alkyl side chain is bound to the dicarboxylic acid component or to the diol component of the ester segments and whether the bond is through an ether bridge or an ester group, has little effect on the properties.

There are substantially two approaches to the preparation of the new A2 polyesters. The monocarboxylic acids and monoalkanols can be reacted (prior to the polyester formation) with tri- or more functional dicarboxylic acids or their anhydrides or their ester-forming derivatives, especially the methyl esters or the tri- or more functional polyols, to form monoesters or, in some cases, diesters, or to the monoethers or, in some cases, diethers. This procedure is advisable especially in the case of the hard-to-esterify versatic acids and, sometimes, in the case of branched alcohols such as 2-ethylhexanol. The installation of versatic acids is possible by the use of the corresponding common commercial glycidyl esters, in which case it is preferable first to react them with a dicarboxylic acid, e.g., an aliphatic dicarboxylic acid and, in the second step, with aromatic dicarboxylic acid anhydrides, and then additional polyester raw materials can be added.

On the other hand, monocarboxylic acids and/or monoalkanols can be present during the esterification and polyester formation, in which case also an excess of the monofunctional side-chain-building compounds is possible and desirable. The transesterification and polyester formation can be promoted by catalysts. Also, the statistical distribution can be promoted by, in some cases, lowered esterification temperatures and longer esterfication time. In general, the temperatures in the esterification and polyester formation are around 180° to 260° C., preferably 200° to 240° C.

At the end of the polycondensation it is desirable to lower the pressure to 10 to 20 mbar.

Branched alkyl groups, especially in previously formed esters, the tricarboxylic acid alkyl esters and glycidyl versatic acid esters, are virtually not split off in the polycondensation according to the invention. It is possible, but not preferred, to use monoalkanols together with tricarboxylic acids or triols and aliphatic monocarboxylic acids together with triols in the polycondensation, and thus to form the alkyl side chains during the polycondensation.

It is, however, decidedly preferable to previously form corresponding monoesters or monoethers or the di- and triesters, in which all monofunctional alkyl side groups are split off except one per mol.

According to the invention, it is preferred, in the new side chain polyesters, that no conventional branch chains extend from 90% or more of the polyester segments.

In the preparation of the polyesters it is possible to determine that the alkyl moieties of monoalcohols bound to the third function of tricarboxylic acids and of monocarboxylic acids bound to the third function of triols are not split off and are retained in the hydroxyl polyesters; this can be accomplished simply by analyzing the distillate of the esterification and polycondensation. Alkyl side chains bound to first and second functions of polyester-forming components, e.g., methanol in dimethyl terephthalate and two alkyl groups in tricarboxylic acid trialkyl esters, are nevertheless split off and occur in the distillate as free alkanols or monocarboxylic acids.

In the preparation of both of the hydroxyl polyesters A1 and A2, an excess of diols plus triols or their esters or derivatives is used with respect to dicarboxylic acids plus tricarboxylic acids or their esters or derivatives, and as the polycondensation progresses, the excess of the diol is removing, until hydroxyl numbers of 10 to 100 are reached, and acid numbers lower than 5, preferably lower than 3, and very preferably under 1.

In the removal of the final amounts of excess diol and in the lowering of the hydroxyl numbers to the final value, crosslinking due to cleavage of alkyl side chains must not occur, which is manifested by the sticking of the stirrer, a rapid increase in the viscosity by at least one power of ten, and the development of a tough elastic mass. Such a spoiled batch is to be repeated in the same manner, in which case, however, a hydroxyl number higher by 5 than the last one measured on the spoiled batch is the final hydroxyl number, or, otherwise, the final temperature of the polycondensation is to be lowered by 10° C. or the pressure is to be raised to 40 to 50 mbar.

Another approach is the use of tricarboxylic acid trialkyl esters (cf. Example 1) instead of equal molar amounts of the monoester or of the ester of Exaple Ib. Trimethylolpropane monoester (Example Ia) and especially glydicyl esters, especially the esters of all versatic acids, have proven to be very stable.

The terminal group concentration is measured by the acid number and the hydroxyl number, both in mg KOH/g, and the carboxyl number (C) in mVal.-COOH/kg of polymer according to H. Pohl, Analytic. Chem. 26 (1954), 1614.

The stated molecular weights are average molecular weights (M) on the basis of measurements of the gel permeation chromatography (GPC) and an estimate based on the contained peaks, which indicate the centers of gravity of the contained molecular weights, or average molecular weights (M) calculated from the hydroxyl number.

In polyesters A1 and A2, 10 to 90% of the hydroxyl groups are replaced by methacrylic groups or acryl groups. The polyesters thus functionalized, when applied in thin coats, permit crosslinking with electron beams or ultraviolet radiation. In the case of ultraviolet radiation, a photosensitizer, for example according to Polymers Paint Colour Journal, vol. 175 (April 1985), pages 247 to 250, are added in amounts of 1% before the crosslinking. The polyesters can be reacted according to the examples identified by an F with basically any acrylic compounds and methacrylic compounds which contain an additional group that is reactive with hydroxyl groups, such as the isocyanate group, an ether group, or a glycidyl group, while in the case of glycidyl acrylates and methacrylates first a carboxyl polyester is to be made by reaction with dicarboxylic acid.

The term, "pressure-sensitive adhesive," is to be understood to mean coatings on paper, plastic or the like, which have the special property of permanent tack or stickiness. This preferred use is especially suitable for the claimed polyesters, since in this manner pressure-sensitive adhesives can be prepared which contain no solvent or diluent which might interfere with the crosslinking.

In preparing the pressure-sensitive adhesives it is especially advantageous first to prepare one of the polyesters A1 or A2 and then perform the reaction with acrylate compounds or methacrylate compounds according to b in the same vessel. Then, in the same vessel, any other addition of adjuvants can be made or, if desired, the hydroxyl groups of the polyesters that have not reacted with (meth)acrylate groups can be transposed with additional reactively crosslinking or nonreactive groups. Preferably, however, the residual 10 to 90% of the hydroxyl groups which are not replaced by (meth)acrylate groups are retained in the pressure-sensitive adhesives.

The hydroxyl polyesters A1 and/or A2 thus functionalized with methacrylate groups or acrylate groups are macromers which can be directly crosslinked by radiation, and which surprisingly have a sufficiently low viscosity at 50° to 100° C. to be applied in a thin coating to a foliar substrate, i.e., paper or plastic webs, and can form the pressure-sensitive adhesive by radiation crosslinking. Surprisingly, therefore, no solvents or diluents are present or needed in the radiation-curable macromers, and the evaporation of solvents or the like required with pressure-sensitive adhesives according to the state of the art is eliminated and handling is substantially facilitated.

Furthermore, especially the preferred A2 polyesters result, after functionalization in more elastic and particularly more cold-resistant pressure-sensitive adhesives. The permanent tackiness persists for an unusually long time, and their tackiness is adjustable to any particular application by selecting the components of the polyesters. The special advantage of the radiation-curable macromers is, according to the invention, the previously unattainable low viscosity.

In a second step, the transposition of 10 to 90% of the hydroxyl groups of the polyesters with acrylate compound takes place, and thus the replacement of 10 to 90% of the hydroxyl groups by acrylate groups.

It matters little what kind of acrylate compounds or methacrylate compounds are used as long as the compound in question has an additional group that is capable of reacting with the hydroxyl group of the polyesters.

In the simplest case, acrylic acid, methacrylic acid or acrylic chloride, methacrylic chloride or the anhydrides of acrylic acid or methacrylic acid can be used.

This functionalization according to b5 is not preferred because these compounds are difficult to handle. It is necessary to add the conventional polymerization inhibitors as described under b2.

According to b1, furthermore, isocyanato alkyl acrylate or isocyanato alkyl methacrylate can be used for the functionalization, in which case alkyl has the meaning of ethyl or propyl.

According to b2, adducts which have an isocyanato group and an acrylate moiety or a methacrylate moiety can be used in the ratio of 1:1. These adducts are prepared prior to the reaction with the hydroxyl polyesters from, on the one hand, diisocyanates or, in some cases, polyisocyanates or isocyanato prepolymers of polyesters or polyethers of low molecular weight which have two isocyanate groups in the molecule, and, on the other hand, approximately equivalent molar amounts of hydroxyalkylacrylate or hydroxyalkylmethylacrylates.

The preferred isocyanates are toluylene diisocyanate, methylenediphenyl-4,4'-diisocyanate, hexamethylene diisocyanate, benzene-1,4-diisopropyl isocyanate, isophorone diisocyanate, and other diisocyanates. In like manner, triisocyanates can also be used, which are also reacted with two mols of hydroxyalkyl acrylate. Isocyanate prepolymers can be used in prepared form, e.g., in the form of Desmodur PF (Bayer AG), or can be prepared from triethylene glycol, for example, by reaction with the named diisocyanates. In like manner, for example, a reaction product of a molecular size of 3 or 5, or 2 mols of ethylene glycol and 1 mol of a dicarboxylic acid and one of the diisocyanates can be reacted, so that the named adduct is formed.

Temperatures of 50° to 120° C. are sufficient for the formation of the adducts. The operation must be performed with the exclusion of atmospheric humidity and reaction of the isocyanates and polyisocyanates, except of a remainder of about 10%, must be verified by analysis.

Furthermore, according to b3, methyl-acrylamidoglycolate methyl ether (MAGME) made by Dyno Cyanamid C.V., Rotterdam, or the corresponding acrylamidoglycolate methyl ether can be used. Here a transetherification takes place, the methanol released being removed under the conditions of the reaction as specified below.

Also, according to b4, first a reaction of 10 to 90% of the hydroxyl groups of the polyester with a dicarboxylic acid can be performed, or preferably with an anhydride of a dicarboxylic acid, e.g., with phthalic acid anhydride or any other aliphatic or aromatic dicarboxylic acid anhydride. This reaction can take place best directly after formation of the polyester. The desired amount of the hydroxyl groups will remain according to the amount of the dicarboxylic acid anhydride. Then the carboxyl groups that have formed by the reaction of the dicarboxylic acid or of the dicarboxylic acid anhydride are reacted with glycidyl acrylate or glycidyl methacrylate, preferably with the addition of an polymerization in hibitor.

Unless otherwise stated, the reaction of the hydroxyl groups of the polyester with 1.0 to 1.1 mol of substances b1 to b5 per mol of the hydroxyl groups to be reacted takes place at 60° to 150° C. and pressures from 300 mbar to standard pressure, with the exclusion of atmospheric humidity.

In like manner, the reaction with the acrylate compounds or methacrylate compounds can be performed at the temperatures given on already-produced polyesters. Any other acrylate compounds and methacrylate compounds can be used which are reactive with the hydroxyl groups or with carboxyl groups of a carboxyl polyester (which forms from the hydroxyl polyester by transposition with dicarboxylic acid anhydrides).

In this manner the acrylate-functional or methacrylate-functional macromers form, which by radiation crosslinking yield pressure-sensitive adhesives, 2 to 5 Mrad being sufficient in the thin coating used on account of the surprisingly high reactivity of the functionalized macromers.

Due to the low viscosity of the functionalized macromers it is possible to apply 5 to 200 g of macromers in a single procedure, at 50° to no more than 100° C., to paper or plastic films, by means for example of a wire rod or roller, and to perform the crosslinking to form the pressure-sensitive adhesive by means of radiation from an electron beam radiator (EB) or by ultraviolet radiation. In the case of ultraviolet light crosslinking, a photoinitiator or photosensitizer is to be added to the macromers in amounts of 0.5 to 1.5%, and this can be done directly after preparation. Suitable photoinitiators are described in Polymers Paint Colour Journal, Vol. 175 (April 1985), pages 147 to 250.

In the examples, the examples of functionalization are distinguished with an F and those of crosslinking by a V.

EXAMPLES

Example 1

In a reactor with a top column, control thermometer and contact thermometer, the triester is prepared from 464 g (2.417 mol) of trimellitic acid anhydride and 990 g (7.615 mol) of 2-ethylhexanol, using 0.75 g of octyleneglycol titanate as catalyst, by esterifying the mixture at 160° to 210° C. for 5 hours, with stirring and under nitrogen gas, while maintaining a column top temperature of about 102° C. When an acid number of less than 3 mg KOH/g is reached, 333 g (3.142 mol) of diethylene glycol is added and the column is closed. After changing over to a distillation bridge, the mixture is transesterified, and 2-ethylhexanol is distilled out at 200° to 230° C. such that the vapor temperature does not exceed 165° C. When the vapor temperature drops to less than 100° C. at an internal temperature of 230° C., a vacuum is applied (800 mbar diminishing to 300 mbar), so that the vapor temperature is in the range from 100° to 165° C. The transesterification is performed in this manner until the final characteristics are attained. Then the vacuum is broken with nitrogen and the product is cooled.

Characteristics:
Acid No. less than 0.2 mg KOH/g
Hydroxyl No.: 40.0 mg KOH/g
$V_{20}$: 88 Pa.s
$T_g$: −38° C.
$\overline{M} = 3,200 - 4,800$ In the distillate from this batch, 676 g of 2-ethylhexanol and 84 g of diethylene glycol were found.

In the product, it is reckoned from this that 1 mol of 2-ethylene hexanol per mol of trimellitic acid is bound and contained as an alkyl side chain, and this is confirmed by analysis. The ratio of ester segments to alkyl side chains is 1:1 mol.

In subsequent batches of this alkyl side chain polyester, the distillate can be used as a source of 2-ethylhexanol. In the polyester formation, in this case, the amount of diethylene glycol is reduced by the amount already added.

Example 2

13.57 kg of glycidyl ester of versatic acid 10 (Shell's Cardura® E10+)[1] was heated in a reactor with a top column and a control thermometer and a contact thermometer, at 110° C., with stirring, under a nitrogen atmosphere. Then 4.35 kg of adipic acid and 67 g of Dynapol AlV ®[2] were added. The glycidyl adipate was formed with a slight exotherm, resulting in a temperature rise to 140° C. The temperature of 140° C. was maintained for 30 minutes. Then followed the addition of 8181 kg of phthalic acid anhydride and 5.52 kg of diethylene glycol. The reactor contents were heated to 235° C. within 1 h 30 min. After 5 h at 235° C., 22 g of octylene glycol titanate was added and a vacuum of 150 mbar was applied. The pressure was lowered over a period of 2 h 30 min to 10 mbar, and then on down to 5 mbar. After 4 h under these conditions the condensation was terminated by breaking the vacuum and cooling the product. The product had an acid number of less than 1 mg KOH/g and a hydroxyl number of 40 mg KOH/g, and a viscosity $V_{20}$=4.350 Pa.s.

The setting point is at −15° C.

$\overline{M}$=2,800 to 3,800

[1]Versatic acid of a total carbon count of 10 with alpha,alpha chain branching by mostly methyl groups, with a smaller proportion of ethyl groups.
[2]Adduct of phosphorous acid and 3 mol of versatic acid 10 (Shell's Cardura® 10) according to EP-Al 0 117 912, as protection against oxidative degradation.

In the distillate only the excess of the diethylene glycol was found, but virtually no versatic acid. Accordingly, the remainder of the versatic acid is bound as an alkyl side chain to the glycerol moiety of the polyester, and this was confirmed by analyses. The ratio of ester segments to alkyl side chains is 1:0.53 mol.

Example 3

In a reactor with a top column and a control thermometer and a contact thermometer, the following were charged in a nitrogen atmosphere, with stirring and simultaneous heating: 13.42 kg of a mixture of trimethylolpropane and 2-ethylhexanic acid monoester (Example Ia), 1.88 kg of monoethylene glycol, 5.00 kg of 1,6-hexanediol, 7.37 kg of adipic acid, 8.38 kg of isophthalic acid and 45 g of Dynapol AlV ®[2].
[2]Same as in Example 2.

The release of water begins at about 140° C. and is controlled by the column top temperature (about 105° C.). The end temperature of 240° C. is reached in 2 to 3 hours. 5 to 6 hours later, 3.70 kg of distillate has been produced. 15 g of octylene glycol titanate is added and a vacuum is applied. The final characteristics are attained in about 3 hours with a reduction of the pressure to 10 mbar. The vacuum is broken with nitrogen and the product is cooled.

Characteristics:
  Acid number: 1 mg KOH/g
  Hydroxyl number: 33 mg KOH/g
  $V_{20}$: 948 Pa.s
  Tg: −34° C.
  $\overline{M}$=3,200–4,800

The excess ethylene glycol is found in the distillate, but virtually no hexanediol or 2-ethylhexanic acid. Accordingly the 2-ethylhexanol moiety is bound as an alkyl side chain to the trimethylolpropane moiety in the polyester; this is confirmed by analyses. The ratio of the ester segments to alkyl side chains amounts of 1:0.40 mol.

Examples 4 to 11 and Examples A to C given for comparison

Example 11 is performed as follows: 50.6 g of monoethylene glycol (0.817 mol) and 0.122 g of butyltitanate in a 36.8% solution in 2-ethylhexanediol-1,3 were heated under a nitrogen atmosphere with 97.0 g of monoester of the 2-ethylhexanic acid of trimethylol propane (0.35 mol) in a round flask surmounted by a column and provided with thermometer and stirrer. At about 80° C., 136 g of a dicarboxylic acid mixture ($C_4$–$C_6$) (1 mol) was added. Over 30 minutes the temperature was raised to 150° C., with incipient splitting off of reaction water. After 4 hours 140° C. was reached, at an acid number of 14.5 mg KOH/g. After another 60 minutes the acid number was 14.0 mg KOH/g. A vacuum of 100 mbar was applied and reduced to 20 mbar. After 3 hours the vacuum was broken to terminate the condensation, and the product was cooled. The product had an acid number of 1.4 mg KOH/g and a hydroxyl number of 40 mg KOH/g, and a setting point of less than −20° C.

Examples 4 to 10, and Examples A to C given for comparison, are prepared from the components contained in Table 1, in the molar ratios and under the same conditions as in Example 11, using the same excess of ethylene glycol. The polycondensation is broken off at an acid number of less than 2 when the hydroxyl number of 40 is reached. The molecular weights (M) are between 2,600 and 3,500.

Example Ia

Preparation of the monoester from 2-ethylhexanic acid and trimethylolpropane 165.6 g of 2-ethylhexanic acid (1.15 mol) was heated under nitrogen gas in a round flask surmounted by a column and equipped with thermometer and stirrer, and 134.0 g of trimethylolpropane (1.0 mol) plus 0.86 g of ester of phosphorous acid ($H_3PO_3$) prepared from versatic acid glycidyl ester and $H_3PO_3$, and 0.137 g of a 36.8% solution of butyl titanate was added. In 60 minutes 185° C. was reached, with incipient splitting off of the reaction water.

The reaction temperature was then raised to 255° C. After 93.6% of the reaction water had distilled off, the column was removed and changed to the bottom way. Upon reaching an acid number of about 6.2 mg KOH/g, the condensation was terminated by cooling the product. 1.0 mol of 2-ethylhexanic acid is contained in the product per mol of trimethylolpropane.

Example Ib

Trimelliticacid-2-ethylhexyl ester 193 g (1 mol) of trimellitic acid anhydride and 234 g (1.8 mol) of 2-ethylhexanol plus 0.2 g of octylene glycol titanate were placed in a one-liter round flask. The mixture was heated to 150° C. with stirring and the introduction of nitrogen gas, and the splitting off of water begins. Within 4 hours the temperature is raised to 220° C., the distillate is separated by means of a Vigreux column, the top temperature amount to 100° to 150° C. The bath temperature is maintained until the top temperature falls below 80° C. The product has an acid number of 150+10 mg KOH/g. 1.7 mol of 2-ethylhexanol per mol of trimellitic acid is contained in the product.

TABLE 1

Molar ratios and properties of the polyesters

| Example | IS | TPS | PS | DCS | AS | TTE | MEG | DEG | HD | GV | TMME | Tg (°C.) | Visc. Pa.s 20° C. |
|---|---|---|---|---|---|---|---|---|---|---|---|---|---|
| 1 | — | — | — | — | — | 100$^x$ | — | 100 | — | — | — | −38 | 80 |
| 2 | — | — | 67 | — | 33 | — | 47 | — | 53$^{xx}$ | — | — | −15 | 4,350 |
| 3 | 50 | — | — | — | 50 | — | 25 | — | 35 | — | 40$^x$ | −34 | 950 |
| 4 | — | 25 | 25 | — | — | 50$^{xxx}$ | 100 | — | — | — | — | −10 | 3,100 |
| 5 | — | — | — | — | — | 100$^{xxx}$ | 100 | — | — | — | — | −53 | 1,200 |
| 6 | — | 20 | 20 | 60 | — | — | 70 | — | — | — | 30$^x$ | −22 | 1,800 |
| 7 | — | 20 | 20 | 60 | — | — | 70 | — | — | — | 30$^{x3}$ | −30 | 1,900 |
| 8 | — | 10 | 10 | 60 | — | 20$^{xxx}$ | 100 | — | — | — | — | −23 | 2,000 |
| 9 | — | 10 | 10 | 60 | — | 20$^{x2}$ | 100 | — | — | — | — | −25 | 1,700 |
| 10 | — | — | — | 60 | — | 40$^{xxx}$ | 100 | — | — | — | — | −31 | 300 |
| 11 | — | — | — | 100 | — | — | 70 | — | — | — | 30$^x$ | −41 | 130 |
| A | — | 50 | 50 | — | — | — | 100 | — | — | — | — | +55 | solid |
| B | — | 20 | 20 | 60 | — | — | 100 | — | — | — | — | −12 | 2,300 |
| C | — | — | — | 100 | — | — | 100 | — | — | — | — | −35 | 140 |

Key to Table 1:
PS = Phthalic acid
TPS = Terephthalic acid
AS = Adipic acid
IS = Isophthalic acid
DCS = Aliphatic dicarboxylic acid, total carbon $C_4$ to $C_6$ (mixture of equal parts)
MEG = (Mono)ethylene glycol
DEG = Diethylene glycol
HD = 1,6-hexanediol
TTE = Trimellitic acid alkyl ester
GV = Glycidyl ester of versatic acid 10
TMME = Trimethylolpropane monoester
$^x$ = Tri-2-ethylhexyl ester
$^{xx}$ = Versatic acid-10 ester
$^{xxx}$ = Mono-2-ethylhexyl ester
$^{x2}$ = Monolauryl ester
$^{x3}$ = Coconut fatty acid ester

Examples 12 to 15

Example 2 is repeated, but the amount of the glycidyl ester is varied, namely to 2 (Example 12), 20 (Example 13), 40 (Example 14) and 70 (Example 15), so that 98 mol-% of diethylene glycol are contained in the product in Example 12, and in the examples following 80, 60 and 30 mol-% of diethylene glycol, and an excess of diethylene glycol corresponding to Example 2 is used in the mixture. As the glycidyl ester content increases, the set point Tg and the viscosity decrease.

Examples 16 to 18

Example 3 is repeated, but in this case 5 mol-% (Example 16), 20 mol-% (Example 17) and 50 mol-% of trimethylolpropane-mono-2-ethylhexylester (Example 18) and accordingly 60 mol-% (Example 16), 45 mol-% (Example 16) and 15 mol-% (Example 17) of monoethylene glycol, with equal amounts of 35 mol-% of 1,6-hexanediol and 50 mol-% of isophthalic acid and 50 mol-% of adipic acid, is contained in the product. An excess of monoethylene glycol is added to the mixture and removed as the polycondensation proceeds. The product has a hydroxyl number of 40.

Example 19

Polyesters with alkyl side chains composed of

| | |
|---|---|
| adipic acid | 60 mol % |
| phthalic acid anhydride | 40 mol % |
| Cardura E 10 ® | 33 mol % |
| 1,6-hexanediol | 55 mol % |
| neopentyl glycol | 12 mol % |

By the procedure of Example 2, an alkyl side chain polyester was prepared from the following starting substances: Glycidyl ester of versatic acid E10 (Cardura ® E10)=8.89 kg, 1,6-hexanediol=7.66 kg, neopentyl glycol-1.48 kg, and the acid components, adipic acid 8.94 kg, phthalic acid anhydride=6.04 kg, and Dynapol AlV ® (cf. Example 2)=67 g, octyleneglycol-titanate=22.5 g.

Acid number less than 1, hydroxyl number 30, $V_{20}$=795 Pa.s, TG=−30° C.

Example 20

Polyesters with alkyl side chains composed of

| | |
|---|---|
| adipic acid | 40 mol % |
| phthalic acid anhydride | 40 mol % |
| isophthalic acid | 20 mol % |
| Cardura ® E10 | 33 mol % |
| 1,6-hexanediol | 40 mol % |
| neopentyl glycol | 17 mol % |

By the procedure of Example 2 the polyester was prepared from the following starting material: glycidyl ester of versatic acid 10 (Cardura ® E10)=8.78 kg, 1,6-hexanediol=6.89 kg, neopentyl glycol=2.07 kg, adipic acid=5.89 kg, phthalic acid anhydride=5.97 kg, isophthalic acid—3.35 kg, and Dynapol AlV ®=67 g, and octyleneglycoltitanate=22.5 g.

The polyester obtained had the following characteristics: acid number less than 1, hydroxyl number 38, $V_{20}$=2,610 Pa.s, Tg=−22° C.

Example 21

Polyester with alkyl side chains, composed of:

| | |
|---|---|
| adipic acid | 100 mol % |
| 1,6-hexanediol | 35 mol % |
| monoethylene glycol | 25 mol % |
| Trimethylolpropane monoester of ethylhexylic acid | 40 mol % |

By the procedure of Example 2, a polyester was prepared from the following starting substances: adipic acid=15.19 kg, 1,6-hexanediol=4.97 kg, monoethylene glycol=1.87 kg, trimethylolpropanemonoethylhexyl ester (cf. Example Ia)=13.40 kg, as well as Dynapol AlV ®=30 g, and octyleneglycoltitanate=15 g.

Characteristics: Acid number less than 1, hydroxyl number 24, $V_{20}$ 70.8 Pa.s, Tg= −50° C.

Examples of Functionalization with Acrylates

Example IIa

Preparation of the 1:1 adduct of IPDI/HEA

Raw materials for 100 kg:

| | |
|---|---|
| isophorone diisocyanate (IPDI) | 65.68 kg |
| 2-hydroxyethylacrylate (HEA) | 34.32 kg |
| dibutyltin dilaurate (DBTL) | 50 g |
| polymerization inhibitor (2,6-di-tert.-butyl-4-methylphenol) | 50 g |

IPDI, DBTL and the polymerization inhibitor are placed in a reactor and heated to 40° C. HEA is steadily fed in for 3 hours with stirring. As soon as the exothermic reaction raises the temperature to 60° C., the mixture is cooled, so that the temperature does not exceed 80° C. but does not fall below 50° C. After the addition of the HEA is completed, the reactor contents are held at 60° C. until the NCO content has dropped to 12.2% (2 hours later). Viscosity 8000 to 12,000 mPa.s at 20° C. The product can be handled in the open air for a brief period, but when kept for a fairly long time it must be protected against atmospheric moisture in sealed containers.

Functionalization of Polyesters by Acrylation

Example F1

The polyester of Example 2 is cooled to 120° C. directly after preparation and the vacuum is set at 400 mbar, in the one case, and in the other a finished polyester according to Example 2 is heated to 120° C. at a vacuum of 400 mbar. With stirring, 12.5 kg of the adduct of Example IIa is added for each 100 kg of the polyester of Example 2, and stirred for 1 hour until the NCO content has dropped to below 0.2%.

By this reaction the hydroxyl groups of the polyester of Example 2 are reactedfrom an original hydroxyl number of 40% to 50%, so that then there are acrylate moieties instead of half of all the hydroxyl groups. Such a product is called A50.

Viscosity at 50° C. 114 Pa.S; Tg= −5° C.

Examples F2 and F3

In the same manner as in Example F1, the polyester of Example 2 is reacted with 7.5 kg (Example F2) and with 17.5 kg (Example F3) of the adduct of Example IIa.

In Example F2 the functionalization amounts to 30% of the hydroxyl group present in the polyester (Product A30). The viscosity at 50° C. amounts to 192 Pa.s, Tg −10° C.

The product of Example F3 is 70% functionalized (Product A70). The viscosity at 40° C. amounts to 310 Pa.s, Tg −4° C.

EXAMPLE F4

By the procedure of Example F1 the polyester of Example 1 is reacted with 12.5 kg of the product of Example IIa for each 100 kg of the polyester. A product forms with 50% of the hydroxyl groups functionalized. The viscosity at 50° C. amounts to 35 Pa.s, Tg −32° C.

Example F5

The polyester of Example 3 is reacted by the procedure of Example F1 with 12.5 kg of the adduct of Example IIa. A functionalized polyester results, with a viscosity of 88 Pa.s at 50° C., Tg −25° C.

Example F6

The polyester of Example 2 is heated at 150° C. with stirring, and 11.8 kg of phthalic acid anhydride per 100 kg of the polyester is added. After 30 minutes the hydroxyl number has dropped to 17 mg KOH/g, while the acid number reaches 18 mg KOH/g. Then 9.1 kg of glycidyl methacrylate and 50 g of hydroquinone as polymerization inhibitor are added, and the mixture is reacted for an additional 30 minutes at 150° to 170° C., with stirring. The product is cooled and bottled.

The acid number is 2 mg KOH/g, the viscosity at 20° C. is 4,500 Pa.s, Tg −10° C.

Example F7

The polyester of Example 2 is heated to 150° C. with stirring, For every 100 kg of the polyester, 4.6 kg of methylacrylamidoglycolate methyl ether (MAGME) plus 50 g of p-toluenesulfonic acid and 50 g of hydroquinone are added, and the mixture is allowed to react for another 50 minutes at 150° C.

A polyester results 50% of whose hydroxyl groups are acrylated.

Viscosity at 20° C. 4,300 Pa.s, Tg −15° C.

Example F8

The Addition of Resin

The functionalized polyester of Example F2 is homogenized in a kneader in amounts of 800 parts with 200 parts of polyvinylmethyl ether (Lutonal M40 of BASF) at 70° C.

If the crosslinking is performed with ultraviolet radiation, 1% of Merck°s Darocur 1173 is added as a photoinitiator.

Crosslinking to Form Pressure-Sensitive Adhesives from functionalized polyesters.

V1-Electron Beam Crosslinking

One of the functionalized polyesters named in Examples F is applied with a wire rod at 100° C. to a paper of 80 g/sq. m. or a similar plastic film, at the rate of 20 g/sq. cm, and crosslinked by means of an electron beam apparatus (Electrocurtain, of Energy Sciences Int.) at 3 Mrad.

V2-Ultraviolet radiation Crosslinking

The method of application described under V1 and the polyesters named therein are used in the same manner and at the same temperatures, but 1% of Darocur 1173 (Merck) is always distributed as a photoinitiator in the functionalized polyester.

The crosslinking is performed by radiation for 0.5 sec. with an ultraviolet radiator made by Theimer, having an output power of 100 watts per cm.

Application temperatures from 50° C. up can also be selected, if the functionalized polyesters have a low viscosity as stated above.

The properties of the pressure-sensitive adhesives thus obtained are shown in the following table.

TABLE 2

| Polyester No. Examples | Degree of acrylation | Cross-linking by | Peel adhesion (N/2.5 cm)[x] | Shear Adhesion 2 kg[x] | Quick-Stick (N/2.5 cm)[xx] | Rolling Ball tack (cm)[x] |
|---|---|---|---|---|---|---|
| 1 + F4 | 50 | UV | 4 | 10 min. | 2 | — |
| 3 + F5 | 50 | UV | 20 | 2.5 h | 5 | 4 |
| 3 + F5 | 50 | EB | 10 | 2.0 h | 5 | 20 |
| 2 + F2 | 30 | EB | 18 | 9.0 h | 18 | 20 |
| 2 + F1 | 50 | UV | 19 | 45 min | — | 20 |
| 2 + F3 | 70 | UV | 4 | 2.0 h | — | 20 |
| 2 + F8 | 30 | EB | 23 | 24.0 h | 20 | 20 |
| 2 + F7 | 50 | UV | 20 | 8.0 h | — | 20 |
| 2 + F6 | 50 | UV | 12 | 2.0 h | — | 20 |

[x]Test methods of Pressure Sensitive Tape Council (PSTC)
[xx]Test methods of FINAT (FCM)

Example F9, with polyester according to A1

In a two-liter round flask, 800 g of a polyester of the composition: adipic acid/ethylene glycol/neopentyl glycol/1,6-hexanediol/trimethylol propane=100/54/14/29/3, with a molecular weight of 5500, is reacted with 20 g of isocyanatoethyl methacrylate at 80° C. for 60 minutes, with stirring and the exclusion of moisture, so that the NCO content of the product is less than 0.1%. The viscosity of the end product at 25° C. is 140 Pa.s.

Examples F10 and F11

The procedure is the same as in Example F9, but instead of 20 g of isocyanatoethyl methacrylate 26.7 g and 33.3 g are used, respectively.

Examples F12 and F16

(Polyesters A1 with 1:1 adducts according to b2)

In a one-liter round flask, 1 mol of the diisocyanates listed below was placed in each case, at room temperature. With stirring and the introduction of nitrogen, 116 g of hydroxyethylacrylate was added drop by drop over a period of one hour. After another 30 minutes, the NCO content originally present in the mixture had decreased by one half.

| Example | Diisocyanate | NCO content of the adduct | Addition to 800 grams of polyester |
|---|---|---|---|
| F12 | Toluenediisocyanate | 14.5% | 37.2 g |
| F13 | Methylenediphenyl-4,4'-diisocyanate | 11.5% | 47.0 g |
| F14 | Hexamethylene diisocyanate | 14.8% | 36.4 g |
| F15 | Benzene-1,4-diisopropylisocyanate | 11.7% | 46.2 g |
| F16 | Isophorone diisocyanate | 12.4% | 43.4 g |

As in Example F9, 800 g of the polyester described in Example F9 was reacted with the amounts of diisocyanatehydroxyethylacrylate adduct listed in the table, so that the resulting NCO content in the product is less than 0.1%.

Example F17

As in Example F9, instead of 174 g of toluylene diisocyanate, 367 g of an isocyanate prepolymer (Desmodur PF, commercial product of Bayer AG, Leverkusen), and 116 g of hydroxyethylacrylate were reacted. The NCO content in the adduct is about 11.4%. Then, as in Example F9, 800 g of polyester is reacted with 62.0 g of this adduct, so that the resulting NCO content is less than 0.1%.

Example F18

250 g of methylenediphenyl-4,4'-diisocyanate is placed in a one-liter round flask, with stirring and the introduction of nitrogen. 144 g of an oligoether (luphen U 5020, commercial product of BASF, Ludwigshafen) is added drop by drop over a period of 1 hour. Then 58 g of hydroxyethylacrylate is added in drops over a period of 1 hour, so that the NCO content of this product amounts to 3.8%. As in Example F9, 800 g of polyester is then used with 142 g of the adduct, so that an NCO content of less than 0.1% results.

Examples F19 and F20 with polyesters according to A1

As in Example F18, an adduct is prepared from 250 g of methylenediphenyl-4,4'-diisocyanate, 58 g of hydroxyethylacrylate and 480 g of a polyester of the composition: Adipic acid/ethylene glycol/neopentylglycol/tetraethyleneglycol=100/56/14/30, with a molecular weight of 960, which has an NCO content of 2.7%.

As in Example F9, 202 g and 135 g, respectively, are now reacted with 800 g of the polyester described in Example F9, so that the resulting NCO content is less than 0.1%.

Examples F21 and F22

In a one-liter round flask, at a temperature of 80° C., 800 g of the polyester described in Example F9 is reacted with 39 and 65 g, respectively, of a 1:1 adduct made from toluylene diisocyanate and 2-ethylhexanol (NCO=13.8%). Then these products are functionalized as in Example F9 with 26.7 and 20.0 g, respectively, of isocyanatoethylmethacrylate, so that the resulting NCO content is less than 0.2%.

Example F23

800 g of the polyester described in Example F9 is reacted with 8.2 g of trimellitic acid anhydride at 150° C. and then reacted at 80° C. as described in Example F9 with 20 g of isocyanatoethylmethacrylate, so that the resulting NCO content is less than 0.1%.

Examples F24 and F25 with polyester according to A1

As in Example F9, 800 g of a polyester of the composition: trimelliticacidmono-2-ethylhexylester/ethylene glycol=100/100, and with a molecular weight of 2800, is reacted with 26.6 g and 35.4 g, respectively, of isocyanatoethylmethacrylate.

Example F26

The procedure of Example F24 is followed, except that 44.3 g of isocyanatoethylmethacrylate is used for the reaction, and after the reaction 80 g of a tackifying resin (Staybelite Ester 3, Hercules) is added to the product.

Example V3

The liquid products described in Examples F9 to F15 are applied in a thickness of 24 microns to a polyethylene terephthalate film by means of a wire rod and irradiated with an electron beam dose of 4 Mrad. In this manner, tacky-surfaced coatings were produced, whose characteristics were determined by the following methods:

|  |  |
|---|---|
| Peel adhesion | PSTC-1 |
| Share adhesion, 1 kg | PSTC-7 |
| Rolling ball tack | PSCT-6 |

The values are summarized in the following table:

| Example | Peel Adhesion (N/2.5 cm) x | Shear Adhesion (hours) x | Rolling Ball Tack (cm) x |
|---|---|---|---|
| F9 | 1.2 | 0.25 | 5–6 |
| F10 | 2.0 | 6 | 2–3 |
| F11 | 1.5 | >24 | 3 |
| F12 | 3.0 | >24 | 12 |
| F13 | 4.5 | >24 | 3–4 |
| F14 | 3.5 | >24 | 7–8 |
| F15 | 4.5 | >24 | 3–4 |
| F16 | 5.0 | >24 | 6–7 |
| F17 | 3.0 | >24 | 7–8 |
| F18 | 4.5 | >24 | 4–5 |
| F19 | 3.5 | >24 | 5–6 |
| F20 | 3.0 | 8.5 | 1–2 |
| F21 | 2.5 | >24 | 3–4 |
| F22 | 3.5 | 8 | 1–2 |
| F23 | 2.4 | 0.5 | 1–2 |
| F24 | 11 (*) | >24 | >15 |
| F25 | 6 | >24 | >15 |
| F26 | 12 (*) | >24 | >15 |

Example V4

The procedure is similar to Example F26 except that 80 g of another tackifying resin (Kristalex FR75, Hercules) is added.

With this product, 2 PETP films are cemented with an adhesive layer 24 microns thick and crosslinked with an electron beam dose of a 4 Mrad. The peel adhesion of the laminate amounts to 18 N/2.5 cm in a 180° peeling test.

Example 22

Preparation of the polyester of Examples F24 and F25

In a two-liter round flask, 700 g of the trimelliticacid-2-ethylhexylester of Example 14 was heated with 202 g of ethylene glycol with stirring and the introduction of nitrogen. The release of water begins at about 180° C., and the reaction water is distilled off through a Vigreux column and distillation bridge at a top temperature of 100° to 105° C.

The temperature is raised from 180° C. to 210° C. within three hours. 0.6 g of octyleneglycol titanate is now added as esterification catalyst and stirring continues for another hour at 210° C. Then another 0.3 g of octylglycol titanate is added and, after removing the distillation apparatus, a vacuum is applied which is lowered over a period of 30 minutes to 10 mbar. Condensation is continued until the desired characteristics are reached: hydroxyl number=40 mg KOH/g at an acid numbr of less than 1 mg KOH/g.

It will be understood that the specification and examples are illustrative but not limitative of the present invention and that other embodiments within the spirit and scope of the invention will suggest themselves to those skilled in the art.

We claim:

1. A foliar material having a permanently tacky pressure-sensitive adhesive surface, said adhesive comprising
    (a) base polyesters which are hydroxyl polyesters liquid at room temperature having hydroxyl numbers of 10 to 100, acid numbers lower than 5, a glass transition temperature lower than 0° C., and average molecular weight of from 2,000 to 5,000, said polyesters being fluid at 20° C. and having straight-chain alkyl or branched alkyl side chains of 4 to 36 carbon atoms directly bound through ester bonds or ether bonds of at least one trifunctional of polyfunctional carboxylic acids, triols or polyfunctional polyols and hydroxydicarboxylic acids along the main chain of the polyesters, the molar ratio of ester segments of the main chain to the alkyl side chains ranging from 1:0.2 to 1:2.0, and in which 10 to 90% of the hydroxyl groups of said polyesters have been reacted with
    (b) acrylate compounds or methacrylate compounds having additional reactive groups capable of reacting with the hydroxyl groups of said polyesters,
    (c) the resultant (meth)acrylated polyester being spread as a thin coating on said foliar material and then crosslinked by means of electron beams or ultraviolet radiation.

2. The foliar material according to claim 1 in which the crosslinking occurs with the aid of a photoinitiator.

3. The foliar material according to claim 1 in which the crosslinking is done by radiation of from 2 to 5 Mrad.

4. The foliar material of claim 1 in which the acrylate compounds of methacrylate compounds are selected from the group consisting of
    (b1) isocyanatoalkylacrylate or isocyanatoalkylmethacrylate,
    (b2) adducts of di- or tri-isocyanates or polyisocyanates or isocyanato prepolymers of polyesters or polyethers of low molecular weight with hydroxyalkylacrylates or hydroxyalkylmethacrylates,
    (b3) methacrylamidoglycolate methyl ethers,
    (b4) the reaction product of glycidylacrylate or glycidylmethacrylate with carbonyl groups formed by the reaction of the hydroxyl groups of the polyesters with a dicarboxylic acid, a tricarboxylic acid or their anhydrides,
    (b5) methacrylic acid or acrylic acid or their derivatives,
    and mixtures thereof.

5. The foliar material of claim 1, wherein 30 to 70% of the hydroxyl groups of the polyesters are reacted with acrylate compounds or methacrylate compounds.

6. The foliar material of claim 1, wherein the portion of the hydroxyl groups of the polyesters that has not reacted with acrylate compounds or methacrylate compounds is preserved as hydroxyl groups.

7. The foliar material of claim 1, further containing tackifying resins, pigments, anti-aging agents or fillers.

8. The foliar material of claim 4, in which the acrylate compounds or methacrylate compounds are adducts of di- or tri-isocyanates or polyisocyanates or isocyanato prepolymers of polyesters or polyethers of low molecular weight with hydroxyalkylacrylates or hydroxyalkylmethacrylates.

9. The foliar material of claim 8, in which the acrylate compounds of methacrylate compounds are prepared from substantially equivalent amounts of isocyanate compounds and hydroxyalkylacrylates or hydroxyalkylmethacrylates.

10. The foliar material according to claim 9, in which the isocyanate compounds is selected from the group consisting of toluylene diisocyanate, methylenediphenyl-4,4'-diisocyanate, hexamethylenediisocyanate, benzene-1,4-diisopropylisocyanate, and isophoronediisocyanate.

11. The foliar material according to claim 10, in which the acrylate compound is prepared from isophoronediisocyanate and 2-hydroxyethylacrylate.

12. The foliar material according to claim 10, in which the acrylate compound is prepared from toluylene diisocyanate and 2-hydroxyethylacrylate.

13. The foliar material of claim 1, wherein the base polyesters have glass transition temperatures lower than −20° C.

14. The foliar material of claim 1, wherein the base polyesters bear alkyl side chains of 4 to 18 carbon atoms.

15. The foliar material of claim 14, wherein the base polyesters bear alkyl side chains of 8 to 18 carbon atoms.

16. The foliar material of claim 14, wherein the alkyl side chains of the base polyesters are branched.

17. The foliar material of claim 1, wherein the base polyesters, prior to the reaction with acrylate compounds, have hydroxyl numbers from 20 to 60.

18. The foliar material of claim 1, wherein, in the polyesters, the molar ratio of the ester segments of the main chain to the alkyl side chains ranges from 1:0.05 to 1:1.0.

19. The foliar material of claim 18, wherein the alkyl side chains are the alkyl groups of aliphatic monoalcohol partial esters of tri or polycarboxylic acids said esters having an average of two polyester-forming carboxyl groups.

20. The foliar material of claim 19, wherein partial esters are monoester of tricarboxylic acid.

21. The foliar material of claim 18, wherein the alkyl side chains are the alkyl groups of aliphatic monocarboxylic acid partial esters of polyols, said esters having an average of two polyester-forming hydroxyl groups.

22. The foliar material of claim 21, wherein the partial esters are glycidyl monoesters of trimethylol propane monoesters.

23. The foliar material of claim 18, wherein the alkyl side chains are the alkyl groups of aliphatic monoalcohol partial ethers of polyols, said ethers having an average of two polyester-forming hydroxyl groups.

24. The foliar material of claim 23, wherein the partial ethers are monoether of triol.

25. The foliar material of claim 18, in which the base polyester is prepared from trimellitic acid tri-2-ethylhexyl ester.

26. The foliar material of claim 18, in which the base polyester is prepared from trimethylolpropane mono-2-ethylhexanic acid ester.

* * * * *